(12) United States Patent
Kim

(10) Patent No.: US 9,266,514 B2
(45) Date of Patent: Feb. 23, 2016

(54) HYDRAULIC BRAKING DEVICE AND METHOD FOR CONTROLLING THE SAME

(71) Applicant: MANDO CORPORATION, Pyeongtaek-si, Gyeonggi-do (KR)

(72) Inventor: Young Jae Kim, Seoul (KR)

(73) Assignee: Mando Corporation, Gyeonggi-do (KR)

( * ) Notice: Subject to any disclaimer, the term of this patent is extended or adjusted under 35 U.S.C. 154(b) by 0 days.

(21) Appl. No.: 14/315,956

(22) Filed: Jun. 26, 2014

(65) Prior Publication Data

US 2015/0130266 A1 May 14, 2015

(30) Foreign Application Priority Data

Nov. 14, 2013 (KR) .................. 10-2013-0138193

(51) Int. Cl.
*B60T 8/88* (2006.01)
*B60T 13/66* (2006.01)
*B60T 13/68* (2006.01)
*B60T 7/04* (2006.01)
*B60T 13/14* (2006.01)

(52) U.S. Cl.
CPC .............. *B60T 13/662* (2013.01); *B60T 7/042* (2013.01); *B60T 13/146* (2013.01); *B60T 13/686* (2013.01)

(58) Field of Classification Search
CPC ..... B60T 13/14; B60T 13/142; B60T 13/145; B60T 13/146; B60T 13/148; B60T 13/68; B60T 13/662; B60T 13/686; B60T 17/18; B60T 17/22; B60T 17/221; B60T 17/222
USPC ............... 303/10, 11, 122.1, 122.04, 122.05, 303/122.09; 701/29.1, 33.7, 33.9, 34.1
See application file for complete search history.

(56) References Cited

U.S. PATENT DOCUMENTS

2013/0035835 A1* 2/2013 Hachtel et al. ............... 701/33.9
2014/0008965 A1* 1/2014 Ito et al. ........................ 303/3

* cited by examiner

*Primary Examiner* — Thomas J Williams
(74) *Attorney, Agent, or Firm* — McDermott Will & Emery LLP

(57) ABSTRACT

Disclosed herein is a hydraulic braking device including: a reservoir for storing hydraulic oil; a hydraulic pressure supply unit for sucking hydraulic oil from the reservoir and supplying braking pressure to a wheel cylinder; a main flow path for supplying the braking pressure of the hydraulic pressure supply unit to the wheel cylinder; a pressurizing valve for opening/closing the main flow path; a master cylinder for generating braking pressure; a sub flow path for supplying the braking pressure of the master cylinder to the main flow path; a shutoff valve for opening/closing the sub flow path; and a controller for detecting the pressure of the main flow path in a state where both of the shutoff valve and the pressurizing valve are closed, and determining that a leak occurred in the pressurizing valve when the detected pressure is higher than a preset value.

8 Claims, 6 Drawing Sheets

HYDRAULIC BRAKING DEVICE AND METHOD FOR CONTROLLING THE SAME

CROSS-REFERENCE TO RELATED APPLICATIONS

This application claims priority to Korean Patent Application No. 10-2013-0138193, filed on Nov. 14, 2013, the disclosure of which is incorporated herein by reference in its entirety.

BACKGROUND OF THE INVENTION

1. Field of the Invention

Exemplary embodiments of the present invention relate to a hydraulic braking device and a method for controlling the same, and more particularly, to a hydraulic braking device which supplies braking pressure to a wheel cylinder according to the displacement of a pedal, and a method for controlling the same.

2. Description of the Related Art

In general, a braking device of a vehicle may include a vacuum brake to generate a braking force using suction pressure of an engine and a hydraulic brake to generate a braking force using hydraulic pressure.

A hybrid vehicle such as a fuel cell vehicle or electrical vehicle uses a hydraulic brake to implement an idle stop function for improving fuel efficiency, because the fuel cell vehicle or electrical vehicle has no engine.

An active hydraulic booster (AHB) is a kind of a hydraulic braking device which detects the displacement of a pedal through an electronic control unit (ECU) when a driver steps on the pedal, and supplies braking pressure to a wheel cylinder of each wheel so as to generate a braking force. The AHB is also referred to as an electro-hydraulic brake system.

As illustrated in FIG. 1, the electro-hydraulic brake system includes a reservoir 10, a hydraulic pressure supply unit, a main flow path, a pressurizing valve, a master cylinder 41, a sub path, and a shutoff valve. The reservoir 10 stores hydraulic oil therein. The hydraulic pressure supply unit sucks the hydraulic oil from the reservoir 10 and supplies braking pressure to a wheel cylinder. The main flow path supplies the braking pressure of the hydraulic pressure supply unit to the wheel cylinder. The pressurizing valve opens and closes the main flow path. The master cylinder 41 generates braking pressure. The sub path supplies the braking pressure of the master cylinder 41 to the main flow path. The shutoff valve opens and closes the sub flow path.

The ECU detects the displacement of a pedal, and transmits an opening/closing signal to the shutoff valve and the pressurizing valve according to the displacement of the pedal.

When a driver steps on the brake pedal during a normal braking operation, the ECU detects the displacement of the brake pedal through a pedal displacement detector 51, closes the shutoff valves 63 and 64 so as not to transfer hydraulic pressure from the master cylinder 41 to the wheel cylinder, calculates wheel pressure according to a pressure signal of a pressure sensor, and adjusts the pressure of each wheel through independent feedback control.

When electronic control is not performed, the shutoff valves are normally open. Thus, the hydraulic pressure of the master cylinder, generated by the driver, is introduced into the wheel cylinder to perform a braking operation at the minimum level when the system is broken down.

Such an electronic-hydraulic brake system has been disclosed in detail in Korean Patent Laid-open Publication No. 2013-0105960. Thus, the detailed descriptions thereof are omitted herein.

The electronic-hydraulic brake system determines whether to enter a brake control mode according to how much the driver steps on the pedal. Before the pedal position at which the brake control mode is started, a pedal operation section exists, in which the electronic-hydraulic brake system does not enter the brake control mode, but closes only the shutoff valves to form a closed hydraulic circuit.

When the driver steps on the pedal, the pedal reaches a brake control position through the pedal operation section in which the pressurizing valves are not opened but only the shutoff valves are closed.

FIG. 2 illustrates a flow of hydraulic pressure during brake control. During the brake control operation as illustrated in FIG. 2, the shutoff valves 63 and 64 are closed so as not to transfer high pressure from the hydraulic pressure supply unit to the driver through the pedal, and the pressurizing valves 34 and 35 are opened to transfer pressure to the wheel cylinder.

However, in the pedal operation section of the pedal as illustrated in FIG. 4, the pressurizing valves 34 and 35 are not opened before the braking pressure supplied to the wheel cylinder from the hydraulic pressure supply unit is formed. Thus, the flow path between the shutoff valves 63 and 64 and the pressurizing valves 34 and 35 may form a closed hydraulic circuit. Such a situation may occur when the driver steps on the pedal or the value of the pedal displacement detector has an offset. This is because the path of the master cylinder connected to the pedal from the hydraulic circuit is blocked before entering the brake control mode.

The pressurizing valve normally blocks hydraulic oil stored at high pressure in an accumulator, and passes the hydraulic oil only during the brake control, thereby forming braking pressure.

At this time, the pressurizing valve may not completely block the high pressure due to various factors, but a leak may occur. When the leak occurs, the braking pressure may be transferred to the wheel cylinder, and cause a drag which is not required for the vehicle. That is, when a leak occurs in the pressurizing valve while the closed hydraulic circuit of the pedal operation section is formed, the pressure of the closed hydraulic circuit may be increased to generate braking pressure. Then, the braking pressure may cause a drag.

Conventionally, when the position of the pedal is continuously maintained without deviating from the pedal operation section, a drag could not be prevented from occurring.

SUMMARY OF THE INVENTION

The present invention has been made in view of the above problems, and it is an object of the present invention to provide a hydraulic braking device capable of detecting a leak of a pressurizing valve for opening/closing braking pressure, and removing a drag caused by unnecessary braking pressure, and a method for controlling the same.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a hydraulic braking device may include: a reservoir for storing hydraulic oil; a hydraulic pressure supply unit for sucking hydraulic oil from the reservoir and supplying braking pressure to a wheel cylinder; a main flow path for supplying the braking pressure of the hydraulic pressure supply unit to the wheel cylinder; a pressurizing valve for opening/closing the main flow path; a master cylinder for generating braking pressure; a sub flow path for supplying the braking pressure of the master cylinder to the main flow path; a shutoff valve for opening/closing the sub flow path; and a controller for detecting the pressure of the main flow path in a state where both of the shutoff valve and the pressurizing valve are closed, and determining that a leak occurred in the pressurizing valve when the detected pressure is higher than a preset value.

The hydraulic pressure supply unit may include: an accumulator for accumulating braking pressure and supplying the braking pressure to the main flow path; a pump for supplying the hydraulic oil of the reservoir to the accumulator; and a driving motor for driving the pump.

The controller may detect a displacement of a pedal, and transmit a closing signal to the shutoff valve and transmit an opening signal to the pressurizing valve, according to the displacement of the pedal.

When the state in which the pressure of the main flow path is higher than the preset value lasts for a preset time or more, the controller may determine that a leak occurred.

When determining that a leak occurred in the pressuring valve, the controller may open the shutoff valve to lower the pressure of the main flow path.

The controller may close the shutoff valve when the pressure of the main flow path is lowered to the preset value or less.

In accordance with another aspect of the present invention, there is provided a method for controlling a hydraulic braking device supplying braking pressure of a hydraulic pressure supply unit to a wheel cylinder through a main flow path, including a pressurizing valve which opens/closes the main flow path, supplying braking pressure of a master cylinder to the main flow path through a sub flow path, including a shutoff valve which opens/closes the sub flow path. The method may include: determining whether both of the shutoff valve and the pressurizing valve are closed; detecting the pressure of the main flow path, when both of the shutoff valve and the pressurizing valve are closed; and comparing the detected pressure of the main flow path to a preset value, and determining that a leak occurred in the pressurizing valve, when the detected pressure of the main flow path is higher than the preset value.

When the state in which the pressure of the main flow path is higher than the preset value lasts for a preset time or more, it may be determined that a leak occurred.

The method may further include opening the shutoff valve to lower the pressure of the main flow path, when it is determined that a leak occurred in the pressurizing valve.

When the pressure of the main flow path is lowered to the preset value or less by the opening of the shutoff valve, the shutoff valve may be closed.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
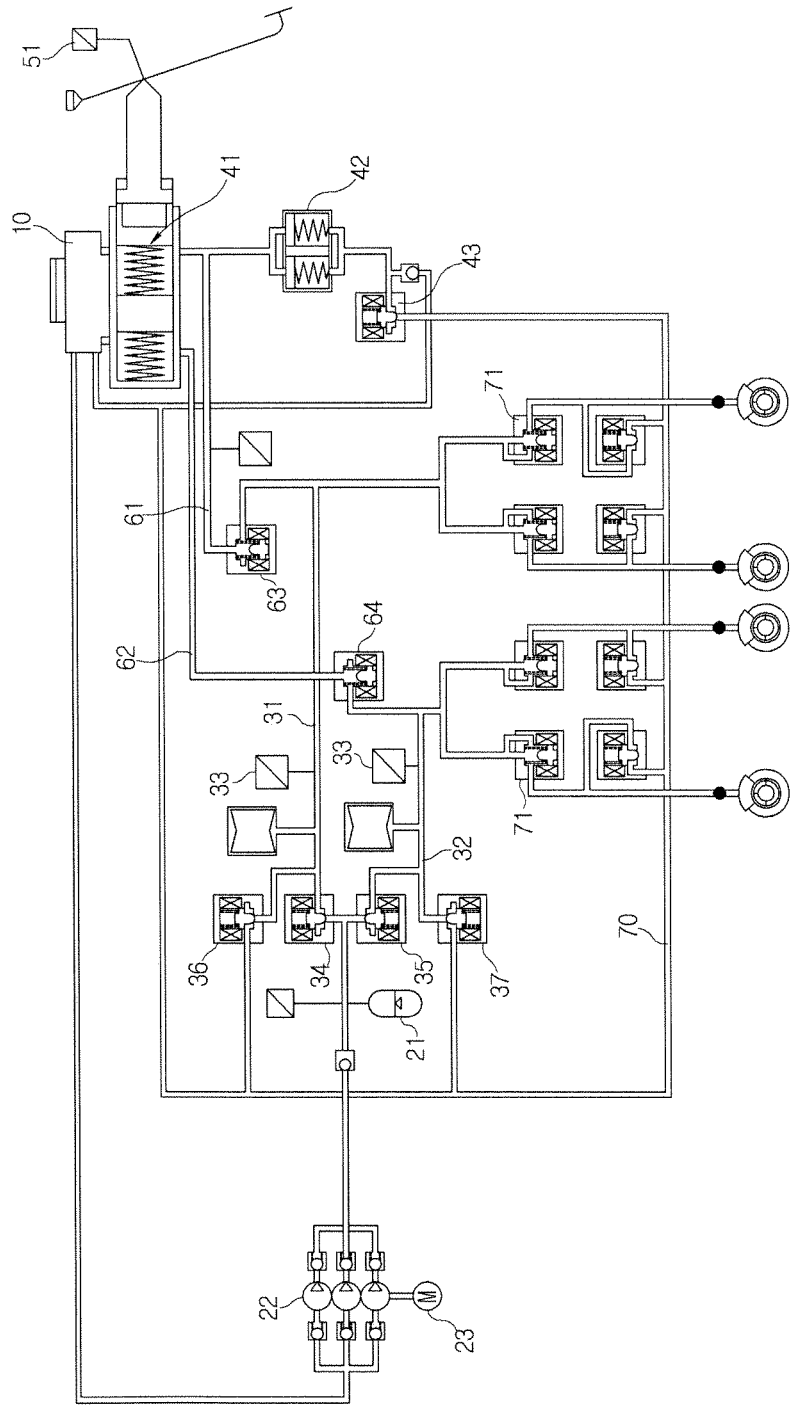
FIG. 1 is a system diagram illustrating a conventional electronic-hydraulic braking device.
Figure 2:
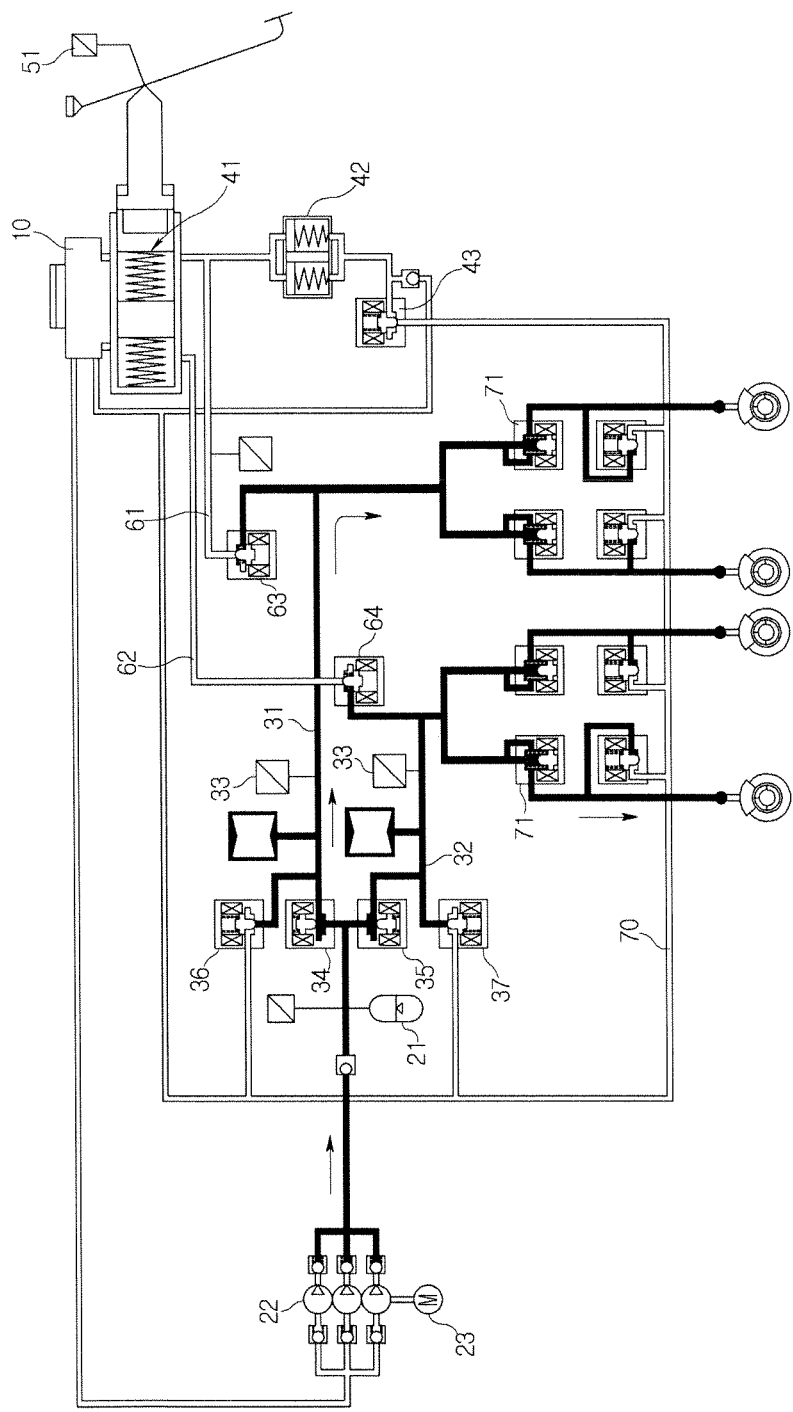
FIG. 2 is a system diagram illustrating an operation state of the electronic-hydraulic braking device of FIG. 1.
Figure 3:
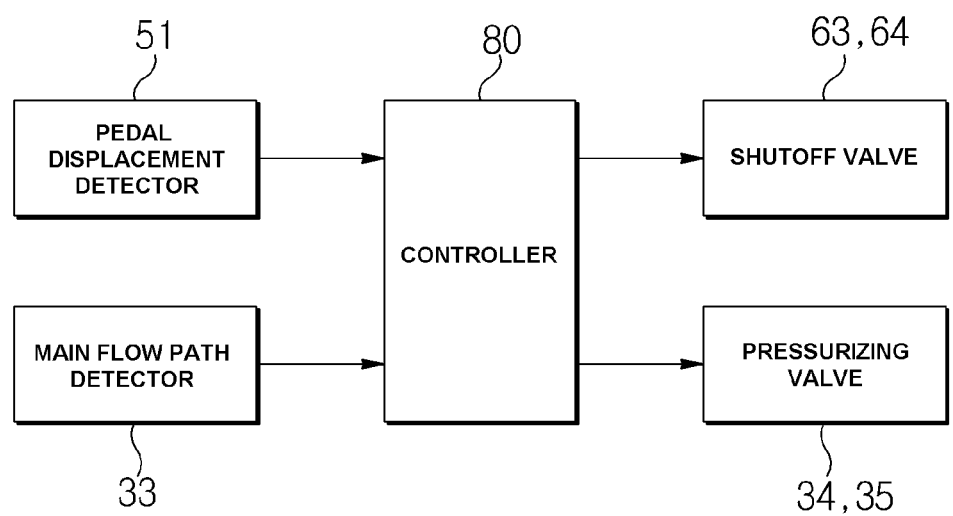
FIG. 3 is a configuration diagram illustrating a hydraulic braking device according to an embodiment of the present invention.

Hereafter, embodiments of the present invention will be described in detail with reference to the accompanying drawings.

Referring to FIGS. 1 to 5, a hydraulic braking device according to an embodiment of the present invention includes a reservoir 10, a hydraulic pressure supply unit, a main flow path, a main flow path pressure detector 33, a pressurizing valve, a master cylinder 41, a sub flow path, a shutoff valve, a pedal displacement detector 51, and a controller 80. The reservoir 10 stores hydraulic oil therein. The hydraulic pressure supply unit sucks hydraulic oil from the reservoir 10 and supplies braking pressure to a wheel cylinder. The main flow path supplies the braking pressure of the hydraulic pressure supply unit to the wheel cylinder. The main flow path pressure detector 33 detects the pressure of the main flow path. The pressurizing valve opens/closes the main flow path. The master cylinder 41 generates braking pressure. The sub flow path supplies the braking pressure of the master cylinder 41 to the main flow path. The shutoff valve opens/closes the sub flow path. The pedal displacement detector 51 detects the operation position of a pedal. The controller 80 detects the pressure of the main flow path through the main flow path detector 33 in a state where both of the shutoff valve and the pressurizing valve are closed, and determines that a leak occurred, when the detected pressure is higher than a preset value.

The hydraulic pressure supply unit includes an accumulator 21, a pump 22, and a driving motor 23. The accumulator 21 accumulates braking pressure and supplies the accumulated braking pressure to the main flow path. The pump 22 supplies the hydraulic oil of the reservoir 10 to the accumulator 21. The driving motor 23 drives the pump 22.

The accumulator 21 is provided at an outlet of the pump 22 and temporarily stores high-pressure oil generated by the pump 22. When a driver steps on the brake pedal, the pressurizing valves 34 and 35 are opened to transfer the hydraulic oil stored in the accumulator 21 to the wheel cylinder.

The main flow path includes first and second main flow paths 31 and 32 of which each is connected to two wheels, and the pressurizing valve includes a first pressurizing valve for opening/closing the first main flow path 31 and a second pressurizing valve for opening/closing the second main flow path 32.

The first and second pressurizing valves 34 and 35 are normally closed-type solenoid valves, and opened during brake control.

The sub flow path includes a first sub flow path 61 communicating with the first main flow path 31 and a second sub flow path 62 communicating with the second main flow path 32. The shutoff valve includes a first shutoff valve 63 for opening/closing the first sub flow path 61 and a second shutoff valve 64 for opening/closing the second sub flow path 62.

The first and second shutoff valves 63 and 64 are normally open-type solenoid valves, and closed during brake control.

The pedal displacement detector 51 detects the position of the pedal, which is changed as the driver steps on the pedal, and transmits the detected position to the controller 80.

The controller 80 detects the displacement of the pedal through the pedal displacement detector 51, and transmits a closing signal to the shutoff valves 63 and 64 or transmits an opening signal to the pressurizing valves 34 and 35, according to the displacement of the pedal.

Figure 4:
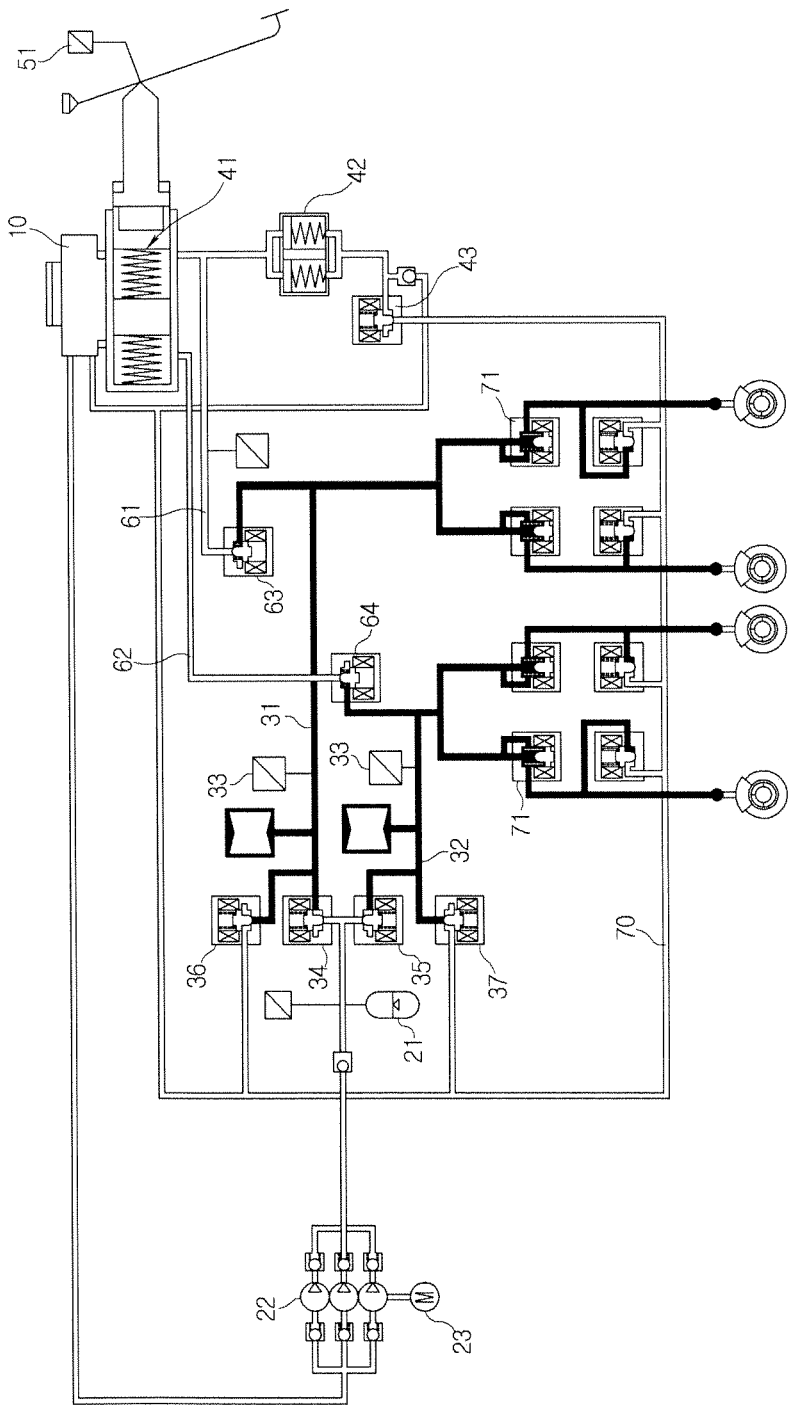
FIGS. 4 and 5 are system diagrams illustrating operation states of the hydraulic braking device according to the embodiment of the present invention.

When the driver steps on the pedal, the pedal reaches a brake control position through a pedal operation section in which the pressurizing valves 34 and 35 are not yet opened but the shutoff valves 63 and 64 are closed. In the pedal operation section in which the shutoff valves 63 and 64 are closed and the pressurizing valves 34 and 35 are not yet opened, a closed hydraulic circuit is formed as illustrated in FIG. 4.

When the pedal is positioned in the pedal operation section, that is, when all of the shutoff valves 63 and 64 and the pressurizing valves 34 and 35 are closed, the controller 80 detects the pressure $P_M$ of the main flow paths 31 and 32, and compares the detected pressure to a preset value $P_C$. When the detected pressure $P_M$ of the main flow paths 31 and 32 is higher than the preset value $P_C$, the controller 80 measures a high-pressure retention time $t_P$.

When the state in which the pressure $P_M$ of the main flow paths 31 and 32 is higher than the preset value $P_C$ lasts for a preset time or more, the controller 80 determines that a leak occurred in the pressurizing valves 34 and 35.

That is, when the high-pressure retention time $t_P$ during which the pressure $P_M$ of the main flow paths 31 and 32 is higher than the pressure value $P_C$ is longer than a preset time $t_C$, the controller 80 determines that a leak occurred in the pressurizing valves 34 and 35.

Figure 5:
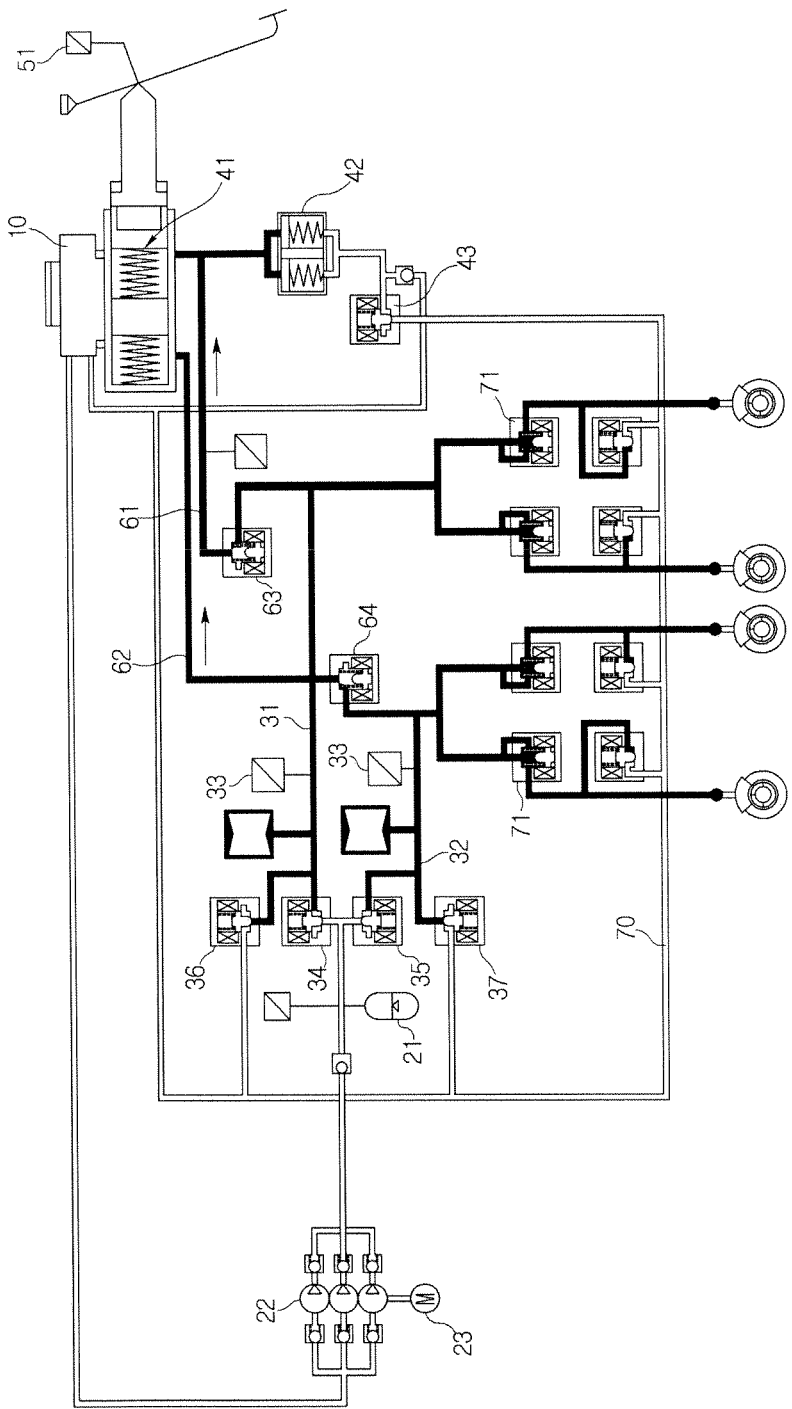

When determining that a leak occurred in the pressurizing valves 34 and 35, the controller 80 opens the shutoff valves 63 and 64 as illustrated in FIG. 5, and discharges the pressure to the sub flow paths 61 and 62 so as to lower the pressure $P_M$ of the main flow paths 31 and 32 to the preset value $P_C$ or less. When the pressure $P_M$ of the main flow paths 31 and 32 is lowered to the preset value $P_C$ or less, the controller 80 closes the shutoff valves 63 and 64 such that the brake control is normally performed.

Reference numerals 36 and 37 represent reducing valves to adjust the pressure of the main flow path, reference numeral 42 represents a pedal simulator, reference numeral 43 represents a simulation valve, reference numeral 70 represents a return path, reference numeral 71 represents a normally open-type solenoid valve.

Figure 6:
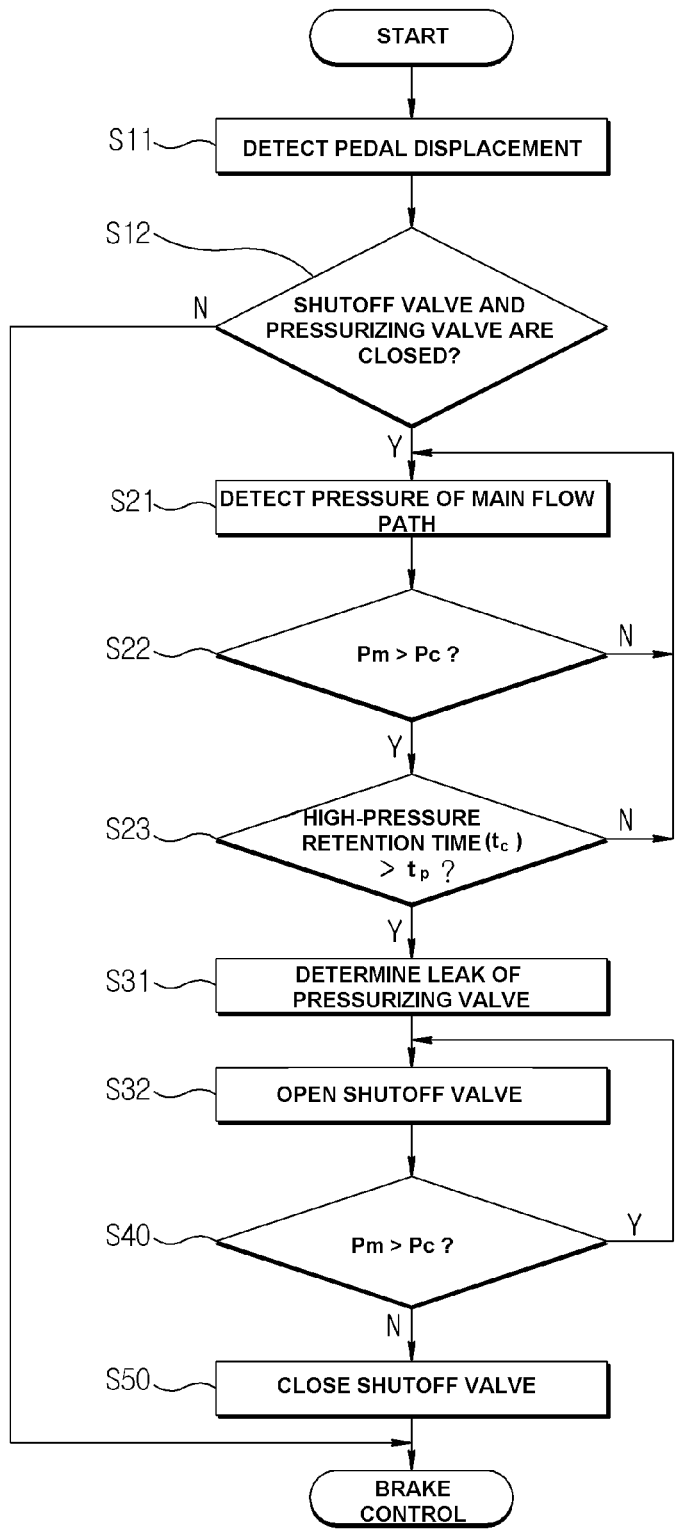
FIG. 6 is a flowchart illustrating a method for controlling the hydraulic braking device according to the embodiment of the present invention.

Referring to FIG. 6, a method for controlling the hydraulic braking device configured in the above-described manner will be described.

First, the controller 80 detects a pedal displacement at step S11, and determines whether the pedal is positioned in the pedal operation section where only the shutoff valves 63 and 64 are closed, in a state where the pedal does not enter the brake control mode because the pedal did not yet reach the position at which the brake control is started.

When the pedal is positioned in the pedal operation section, all of the shutoff valves 63 and 64 and the pressurizing valves 34 and 35 are closed. Thus, the controller 80 may check the displacement of the pedal to determine whether all of the shutoff valves 63 and 64 and the pressurizing valves 34 and 35 are closed, at step S12.

When all of the shutoff valves 63 and 64 and the pressurizing valves 34 and 35 are closed, the controller 80 detects the pressure $P_M$ of the main flow paths 31 and 32 at step S21, and compares the detected pressure $P_M$ of the main flow paths 31 and 32 to the preset value $P_C$ at step S22. When the detected pressure $P_M$ of the main flow path 31 and 32 is higher than the preset value $P_C$, the controller 80 determines whether a leak occurred in the pressurizing valves 34 and 35, at step S31.

Furthermore, when the detected pressure $P_M$ of the main flow path 31 and 32 is higher than the preset value $P_C$, the controller 80 determines whether the high-pressure state lasts for a predetermined time, at step S23. Based on only the condition that the detected pressure $P_M$ of the main flow paths 31 and 32 is higher than the preset value $P_C$, the controller 80 may determine whether a leak occurred. However, when the state in which the detected pressure $P_M$ of the main flow paths 31 and 32 is higher than the preset value $P_C$ occurs for an extremely short time and immediately disappears, this state may not be considered as the state in which the pressure is increased by a leak of hydraulic pressure. Thus, the controller 80 determines whether the high-pressure state lasts for a predetermined time.

When the high-pressure retention time $t_P$ during which the detected pressure $P_M$ of the main flow paths 31 and 32 is higher than the preset value $P_C$ is longer than the preset time $t_C$, the controller 80 determines that a leak occurred in the pressurizing valves 34 and 35.

When it is determined at step S31 that a leak occurred in the pressurizing valves 34 and 35, the controller 80 opens the shutoff valves 63 and 64 to discharge the hydraulic pressure of the main flow paths 31 and 32 to the sub flow paths 61 and 62 at step S32. Then, the pressure $P_M$ of the main flow path 31 and 32 decreases.

When the pressure is lowered at step S32, braking pressure is not formed in the main flow path 31 and 32. Thus, a drag does not occur.

After the main flow paths 31 and 32 are opened, the controller 80 detects the pressure $P_M$ of the main flow paths 31 and 32 at step S40. When the pressure $P_M$ of the main flow paths 31 and 32 is lowered to the preset value $P_C$ or less by the opening of the shutoff valves 63 and 64, the controller 80 closes the shutoff valves 63 and 64 at step S50.

Then, when the pedal reaches the brake control position, the pressurizing valves 34 and 35 are opened to supply braking pressure to the main flow paths 31 and 32.

According to the embodiments of the present invention, the hydraulic braking device and the method for controlling the same may easily detect a leak of the pressurizing valve of opening/closing braking pressure, and remove braking pressure when a leak is detected, which makes it possible to prevent a drag caused by unnecessary braking pressure.

While the present invention has been described with respect to the specific embodiments, it will be apparent to those skilled in the art that various changes and modifications may be made without departing from the spirit and scope of the invention as defined in the following claims.

What is claimed is:
1. A hydraulic braking device comprising:
   a reservoir for storing hydraulic oil;
   a hydraulic pressure supply unit for sucking hydraulic oil from the reservoir and supplying braking pressure to a wheel cylinder;
   a main flow path for supplying the braking pressure of the hydraulic pressure supply unit to the wheel cylinder;
   a pressurizing valve for opening/closing the main flow path;
   a master cylinder for generating braking pressure;
   a sub flow path for supplying the braking pressure of the master cylinder to the main flow path;

a shutoff valve for opening/closing the sub flow path; and a controller for detecting the pressure of the main flow path in a state where both of the shutoff valve and the pressurizing valve are closed, and determining that a leak occurred in the pressurizing valve when the detected pressure is higher than a preset value, wherein when it is determined that the leak occurs in the pressurizing valve, the controller opens the shutoff valve to lower the pressure of the main flow path.

2. The hydraulic braking device according to claim 1, wherein the hydraulic pressure supply unit comprises:

an accumulator for accumulating braking pressure and supplying the braking pressure to the main flow path;

a pump for supplying the hydraulic oil of the reservoir to the accumulator; and a driving motor for driving the pump.

3. The hydraulic braking device according to claim 1, wherein the controller detects a displacement of a pedal, and transmits a closing signal to the shutoff valve and transmits an opening signal to the pressurizing valve, according to the displacement of the pedal.

4. The hydraulic braking device according to claim 1, wherein when the state in which the pressure of the main flow path is higher than the preset value lasts for a preset time or more, the controller determines that the leak occurs.

5. The hydraulic braking device according to claim 1, wherein the controller closes the shutoff valve when the pressure of the main flow path is lowered to the preset value or less.

6. A method for controlling a hydraulic braking device supplying braking pressure of a hydraulic pressure supply unit to a wheel cylinder through a main flow path, including a pressurizing valve which opens/closes the main flow path, supplying braking pressure of a master cylinder to the main flow path through a sub flow path, including a shutoff valve which opens/closes the sub flow path, the method comprising:

determining whether both of the shutoff valve and the pressurizing valve are closed;

detecting the pressure of the main flow path, when both of the shutoff valve and the pressurizing valve are closed;

comparing the detected pressure of the main flow path to a preset value, and determining that a leak occurred in the pressurizing valve, when the detected pressure of the main flow path is higher than the preset value; and opening the shutoff valve to lower the pressure of the main flow path, when it is determined that the leak occurs in the pressurizing valve.

7. The method according to claim 6, wherein when the state in which the pressure of the main flow path is higher than the preset value lasts for a preset time or more, it is determined that the leak occurs.

8. The method according to claim 6, wherein when the pressure of the main flow path is lowered to the preset value or less by the opening of the shutoff valve, the shutoff valve is closed.

* * * * *